(12) United States Patent
Murata et al.

(10) Patent No.: US 12,189,077 B2
(45) Date of Patent: Jan. 7, 2025

(54) METAL DETECTOR

(71) Applicant: A&D Company, Limited, Tokyo (JP)

(72) Inventors: Yutaka Murata, Kitamoto (JP);
Nobuyuki Kurosaki, Kitamoto (JP);
Yuji Nishimura, Kitamoto (JP);
Hisanobu Mizukawa, Kitamoto (JP);
Hiroaki Tsunemi, Kitamoto (JP)

(73) Assignee: A&D Company, Limited, Tokyo (JP)

( * ) Notice: Subject to any disclaimer, the term of this patent is extended or adjusted under 35 U.S.C. 154(b) by 145 days.

(21) Appl. No.: 17/776,882

(22) PCT Filed: Feb. 27, 2020

(86) PCT No.: PCT/JP2020/008059
§ 371 (c)(1),
(2) Date: May 13, 2022

(87) PCT Pub. No.: WO2021/100217
PCT Pub. Date: May 27, 2021

(65) Prior Publication Data
US 2022/0342107 A1 Oct. 27, 2022

(30) Foreign Application Priority Data

Nov. 20, 2019 (JP) ................................. 2019-209875

(51) Int. Cl.
*G01V 3/08* (2006.01)
*G01V 3/10* (2006.01)
(52) U.S. Cl.
CPC .............. *G01V 3/083* (2013.01); *G01V 3/101* (2013.01); *G01V 2003/086* (2013.01)

(58) Field of Classification Search
CPC . G01V 3/00; G01V 3/08; G01V 3/083; G01V 3/10; G01V 3/101; G01V 2003/086
(Continued)

(56) References Cited

U.S. PATENT DOCUMENTS

| 7,423,422 B2 * | 9/2008 | Kubotera ............... G01V 3/105 324/228 |
| 7,663,361 B2 * | 2/2010 | Nishio ................... G01V 3/104 324/239 |

(Continued)

FOREIGN PATENT DOCUMENTS

| CN | 102183294 A | 9/2011 |
| JP | H02-176572 A | 7/1990 |

(Continued)

*Primary Examiner* — Hoai-An D. Nguyen
(74) *Attorney, Agent, or Firm* — Locke Lord LLP; James E. Armstrong, IV; Nicholas J. DiCeglie, Jr.

(57) ABSTRACT

Provided is a metal detector capable of quickly and accurately ascertaining a noise generating situation. A metal detector generates a magnetic field in an inspection region and detects a change in the magnetic field in the inspection region to detect a foreign substance in an inspection object passing through the inspection region. The metal detector measures the change in the magnetic field of the inspection region while changing an inspection frequency, performs frequency analysis of the measurement result, and displays an obtained frequency distribution diagram on the display unit as a noise diagnosis result. In the frequency distribution diagram, target foreign substance reference lines are displayed.

20 Claims, 4 Drawing Sheets

(58) Field of Classification Search
USPC .......................................... 324/323, 332, 334
See application file for complete search history.

(56) References Cited

U.S. PATENT DOCUMENTS

2003/0164766 A1* 9/2003 Britton .................. G01V 3/105
                        340/552
2016/0289789 A1* 10/2016 Peyton ............... G01R 33/1223

FOREIGN PATENT DOCUMENTS

| JP | H04-14913 A | 1/1992 |
| JP | H06-27163 A | 2/1994 |
| JP | 2006-64642 A | 3/2006 |
| JP | 2007-315837 A | 12/2007 |
| JP | 4633830 B2 | 2/2011 |
| JP | 2015-111075 A | 6/2015 |

\* cited by examiner

METAL DETECTOR

TECHNICAL FIELD

The present invention relates to a metal detector, and particularly to a metal detector which quickly and accurately ascertains a noise generation situation.

BACKGROUND ART

Metal detectors are known as devices configured to allow inspection for whether or not foreign substances such as metals have been incorporated into food or the like. Metal detectors generate a magnetic field in an inspection region, cause an inspection object to pass through the inspection region, and detect variation in the magnetic field, thereby allowing inspection for a foreign substance in the inspection object.

Such metal detectors are known to be susceptible to electromagnetic noise (Hereinafter simply referred to as "noise") outside the devices. Therefore, the metal detector of Patent Literature 1 sets a plurality of inspection frequencies with a predetermined bandwidth (for example, 10 kHz) from a "predetermined frequency range in correspondence with an influence of an article of an inspection object" (range of several kHz to several MHz), measures noise with each of the plurality of inspection frequencies, and selects an inspection frequency at which a noise level is equal to or less than a predetermined value. According to this metal detector, since an inspection frequency having a small noise level can be set, a good inspection can be performed at the beginning of the inspection.

CITATION LIST

Patent Literature

Patent Literature 1: Japanese Patent No. 4633830

SUMMARY OF INVENTION

Technical Problem

Incidentally, the metal detector in the related art has a problem that the number of defective products determined to be NG despite being actually non-defective products has suddenly increased and the cause of this occurrence is not accurately known.

As a result of investigating the cause, the inventors of the present invention have found that an inverter device existing around the metal detector is likely to have an influence. More specifically, the inventors have found that a frequency of the noise caused by the inverter device may fluctuate, and as a result of the frequency of the noise and the inspection frequency overlapping, the level of the noise exceeds a threshold value of a target foreign substance and a non-defective product is determined as a defective product.

However, the metal detector in the related art cannot accurately ascertain the situation. For example, the metal detector of Patent Literature 1 described above detects a change in a magnetic field by fixing an inspection frequency to a certain frequency, changes the inspection frequency to detect the change in the magnetic field again, and repeatedly performs the detection. Thus, a huge amount of time is required in accordance with the number of inspection frequencies. Therefore, since some time is taken to diagnose there being noise, if the frequency of the noise due to the inverter device changes during this time, it may not be possible to understand the noise generation situation. In addition, there is a problem that, even if the noise is detected at a plurality of inspection frequencies, the noise between the inspection frequency and the inspection frequency cannot be detected. As described above, the metal detector in the related art has a problem that, even if the number of defective products suddenly increases, the cause thereof may not be able to be ascertained.

The present invention was made in view of such circumstances, and an object of the present invention is to provide a metal detector capable of quickly and accurately ascertaining a noise generation situation.

Solution to Problem

In order to achieve the object, the invention of claim 1 provides a metal detector which generates a magnetic field at an inspection frequency in an inspection region and detects a change in the magnetic field in the inspection region at the inspection frequency to detect a foreign substance in the inspection object passing through the inspection region, in which a frequency distribution diagram obtained by measuring the change in the magnetic field in the inspection region while changing the inspection frequency and performing frequency analysis of the measurement result is displayed on a monitor as a noise diagnosis result.

According to the present invention, the frequency distribution diagram obtained by detecting the change in the magnetic field while changing the inspection frequency and performing the frequency analysis of the detection result is displayed as the noise diagnosis result. Therefore, it is possible to visually ascertain which frequency and what magnitude the noise has. In addition, according to the present invention, since the change in the magnetic field is detected while changing the inspection frequency, a frequency within a certain range can be examined at once and the noise diagnosis can be performed in a short time. Furthermore, according to the present invention, since the change in the magnetic field is detected while changing the inspection frequency, noise having a frequency within a certain range can be detected without omission. Therefore, according to the present invention, since the noise generation situation can be quickly and accurately ascertained, even if new noise occurs during the foreign substance inspection or the frequency of the existing noise changes and the frequency and the inspection frequency overlap, the cause (noise) can be determined immediately. Furthermore, according to the present invention, since the noise generation situation can be ascertained, the inspection frequency can be set to a frequency with less noise before the inspection.

In the invention of claim 2, in the invention of claim 1, a reference line serving as a reference for inspection of the foreign substance is displayed in the frequency distribution diagram. For example, the reference line may be displayed at a position of a signal level corresponding to an amount of change in the magnetic field detected when the target foreign substance passes through the inspection region. As a result, it is possible to determine whether or not the target foreign substance can be detected while comparing with the magnitude of the noise.

In the invention of claim 3, in the invention of claim 2, a plurality of the reference lines is displayed in accordance with the type and size of the foreign substance. According to the present invention, it is possible to ascertain at a glance whether detection of a plurality of types of foreign substances is possible.

In the invention of claim 4, in the invention of any one of claims 1 to 3, in the frequency distribution diagram, a set frequency line is displayed at a position corresponding to a set value of an inspection frequency for generating a magnetic field in the inspection region. According to the present invention, by displaying the set frequency line, it is possible to visually ascertain a relationship between the inspection frequency being set and the noise frequency.

In the invention of claim 5, in the invention of any one of claims 1 to 4, a noise diagnosis button is displayed on the monitor during the foreign substance detection processing and the noise diagnosis result is displayed by pressing the noise diagnosis button. According to the present invention, since the noise diagnosis button is displayed on the screen during the foreign substance detection processing, the noise diagnosis can be performed immediately during the foreign substance detection processing.

In the invention of claim 6, in the invention of any one of claims 1 to 5, a plurality of the frequency distribution diagrams is acquired and displayed by changing the inspection frequency within a plurality of ranges. According to the present invention, since the frequency distribution diagram is acquired and displayed by changing the inspection frequency in a plurality of ranges, the noise generation situation can be ascertained in a plurality of ranges. Therefore, it is possible to visually determine a range of frequencies suitable for detecting a foreign substance. Note that it is preferable that the plurality of frequency distribution diagrams be displayed to be arranged side by side and displayed such that signal levels have the same height.

In the invention of claim 7, in the invention of any one of claims 1 to 6, the frequency analysis is performed using a zoom FFT. According to the present invention, it is possible to save resources required for signal processing and to increase a speed of signal processing. As a result, it is possible to increase a speed of diagnosis processing.

In order to achieve the above object, the invention of claim 8 provides a metal detector which generates a magnetic field at an inspection frequency in an inspection region and detects a change in the magnetic field in the inspection region at an inspection frequency to detect a foreign substance in an inspection object passing through the inspection region, in which a plurality of frequency distribution diagrams obtained on the basis of a measurement result of the change in the magnetic field in the inspection region is displayed on a monitor as a noise diagnosis result and the metal detector receives a setting of the inspection frequency.

According to the present invention, it is possible to visually ascertain a frequency in which there is noise and a magnitude of the noise. Also, since the noise generation situation can be quickly and accurately ascertained, even in the case in which new noise occurs during the foreign substance inspection or the frequency of existing noise changes and the frequency and the inspection frequency overlap, the cause (noise) can be determined immediately. Furthermore, according to the present invention, since the noise generation situation can be ascertained, the inspection frequency can be set to a frequency with less noise before the inspection.

Effects of Invention

According to the present invention, the frequency distribution diagram obtained by detecting the change in the magnetic field while changing the inspection frequency and performing the frequency analysis of the detection result is displayed as the noise diagnosis result. Thus, the noise generation situation can be quickly and accurately ascertained.

DESCRIPTION OF EMBODIMENTS

Figure 1:
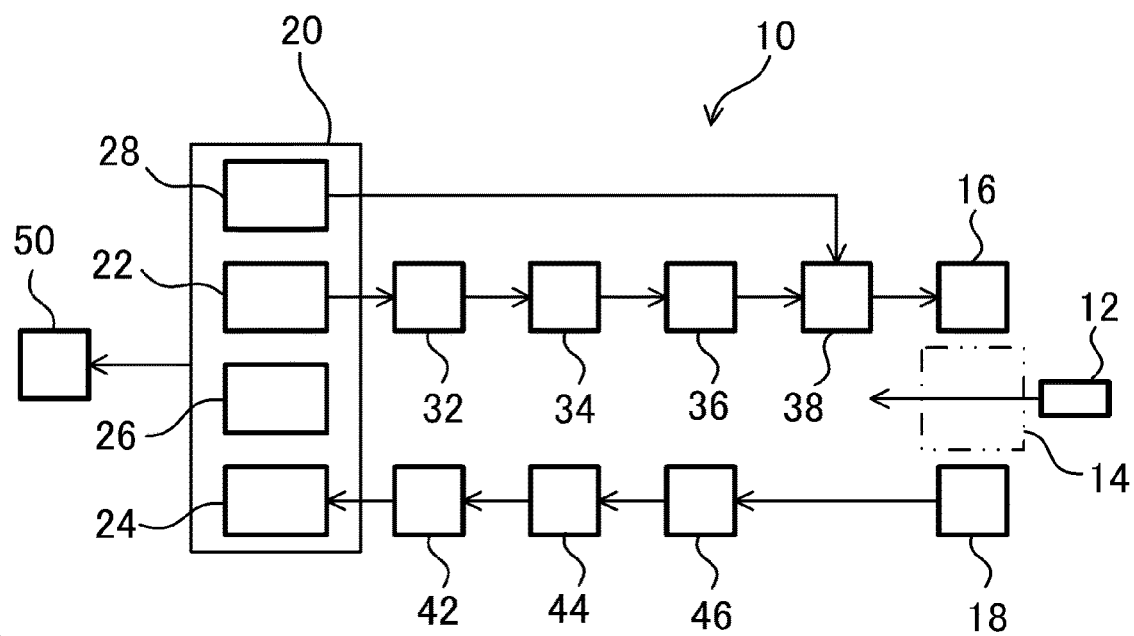
FIG. 1 is a schematic diagram illustrating a configuration of a metal detector of the present invention.

Preferred embodiments of the metal detector according to the present invention will be described below with reference to the accompanying drawings. FIG. 1 schematically illustrates a configuration of a metal detector 10 of the present invention.

The metal detector 10 illustrated in FIG. 1 is a device which passes an inspection object 12 through an inspection region 14 and detects a foreign substance such as a metal and includes a magnetic field generation unit 16 which generates a magnetic field in the inspection region 14 and a magnetic field detection unit 18 which detects a magnetic field fluctuation in the inspection region 14. The magnetic field generation unit 16 includes a transmission coil 17 (refer to FIG. 2) and an alternating current flows through the transmission coil 17, thereby generating a magnetic field in the inspection region 14. A reception coil (not illustrated) of the magnetic field detection unit 18 is provided coaxially with (or at a position vertically facing) the transmission coil 17 of the magnetic field generation unit 16 and a change in the magnetic field of the inspection region 14 can be detected as a change in current flowing through the reception coil. Note that although a mechanism for causing the inspection object 12 to pass through the inspection region 14 is omitted, a belt conveyor or the like is usually used.

The control unit 20 of the metal detector 10 includes a transmission signal setting unit 22, a reception signal processing unit 24, a noise diagnosis unit 26, and a capacitor setting unit 28. The transmission signal setting unit 22 has a function of adjusting an inspection frequency of a signal transmitted to the magnetic field generation unit 16 and an inspection frequency on a detection side in the reception signal processing unit 24 and can continuously change the inspection frequency within a predetermined range or significantly change the predetermined range.

A signal to which the inspection frequency is set by the transmission signal setting unit 22 is subjected to D/A conversion by a D/A converter 32, and then an output thereof is amplified by a drive circuit 34 and a transformer circuit 36 and transmitted to the transmission coil 17 of the magnetic field generation unit 16 via the capacitor adjustment unit 38 which will be described later. As a result, an alternating current flows through the transmission coil 17 and an alternating magnetic field is generated in the inspection region 14.

On the other hand, the reception coil of the magnetic field detection unit 18 is connected to the reception signal processing unit 24 of the control unit 20 via a transformer circuit 46, an amplifier 44, and an A/D converter 42. The reception signal processing unit 24 performs detection processing and filter processing at an inspection frequency synchronized with an inspection frequency on a transmission side. In the case in which a foreign substance exists in inspection object 12, a metal foreign substance can be detected by detecting a magnetic field fluctuation in inspection region 14.

The noise diagnosis unit 26 of the control unit 20 makes a nose diagnosis using the detection result obtained by the reception signal processing unit 24. Specifically, a frequency distribution diagram is created by performing frequency analysis of the data of the reception signal from the reception signal processing unit 24 and is output to and displayed on a display unit (monitor) 50.

A capacitor setting unit 28 of the control unit 20 is connected to a capacitor adjustment unit 38 and the capacitor setting unit 28 controls a capacitor adjustment unit 38 to achieve resonance on the transmission side when the inspection frequency range is remarkably changed.

Figure 2:
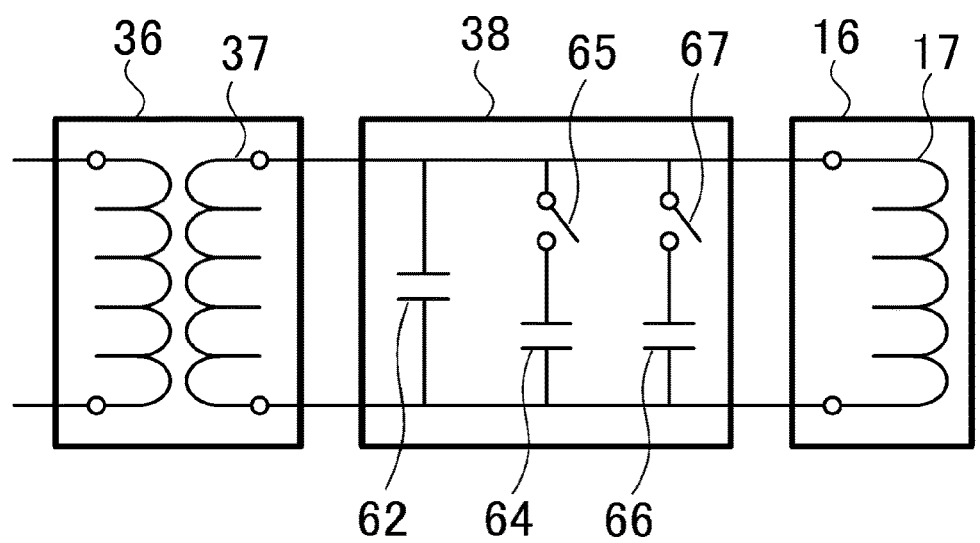
FIG. 2 is a circuit diagram for explaining a capacitor adjustment unit of FIG. 1.

FIG. 2 is a circuit diagram of the capacitor adjustment unit 38. As illustrated in FIG. 2, the capacitor adjustment unit 38 includes a main capacitor 62, a negative capacitor 64, and a positive capacitor 66 and these capacitors 62, 64, and 66 are connected in parallel between a coil 37 of the transformer circuit 36 and the transmission coil 17 of the magnetic field generation unit 16. Among them, the main capacitor 62 is always connected and a normal resonance frequency is set using the main capacitor 62. On the other hand, the negative capacitor 64 and the positive capacitor 66 are connected via switches 65 and 67, respectively, and the switches 65 and 67 are controlled through the capacitor setting unit 28 described above. For example, the switch 67 of the positive capacitor 66 is connected at a normal time and is disconnected when the frequency range is moved toward a positive side. Meanwhile, the switch 65 of the negative capacitor 64 is disconnected at a normal time and is connected when the frequency range is moved toward a negative side.

Here, a frequency range at the normal time (the switch 65 is turned off and the switch 67 is turned on) is set as a normal range, a frequency range when the movement is made toward the positive side (the switch 65 is turned off and the switch 67 is turned off) is set as a positive range, and a frequency range when movement is made toward the negative side (the switch 65 is turned on and the switch 67 is turned on) is set as a negative range. The capacitance of each of the capacitors 62, 64, and 66 is set so that the frequency range adjusted to and the existing range do not overlap. Note that the adjusted frequency ranges may be set to be adjacent to each other.

Figure 3:
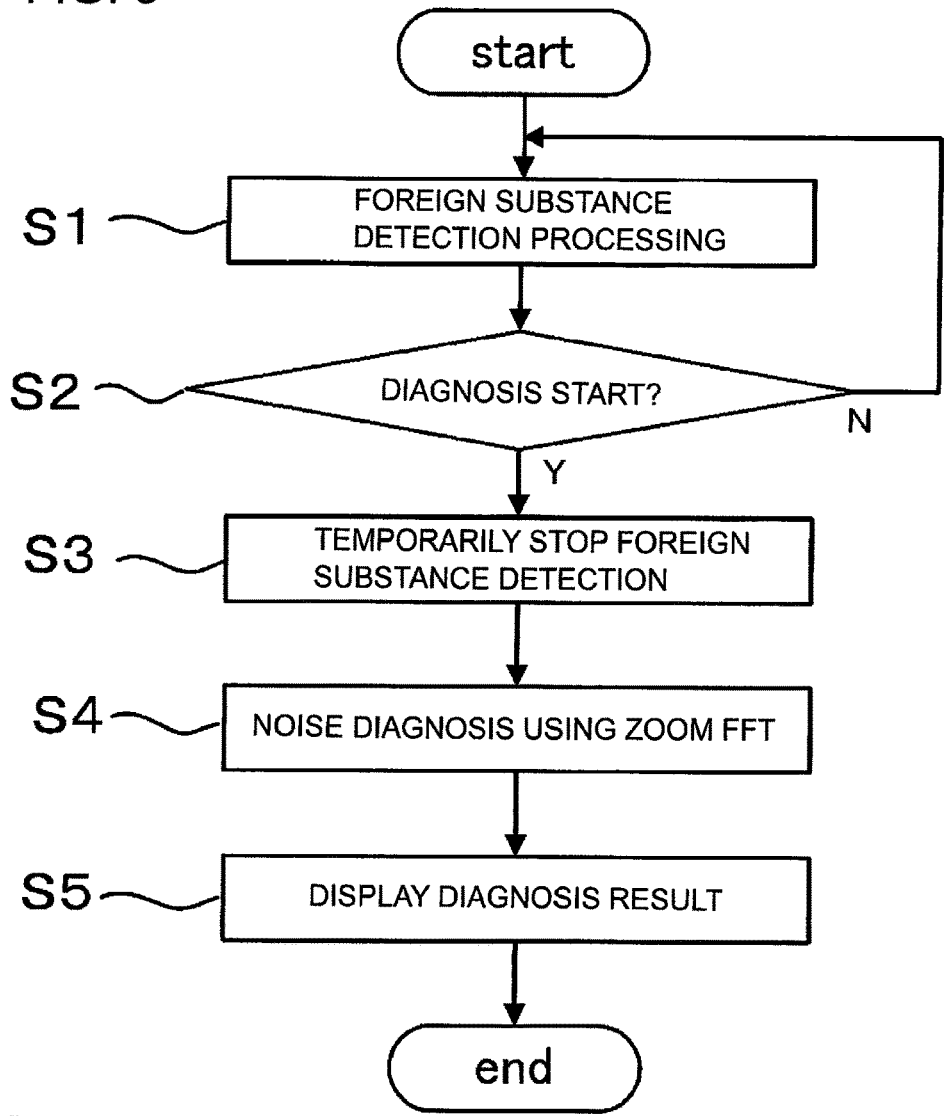
FIG. 3 is a flowchart for describing an example of processing of noise diagnosis.

Noise diagnosis processing of the metal detector 10 configured as described above will be described below. The noise diagnosis processing is performed in the case in which the generation of noise is suspected during the foreign substance detection processing or when the device is initially set up (that is, when the inspection frequency is set). FIG. 3 illustrates a flow of the noise diagnosis processing performed during the foreign substance detection processing.

The foreign substance detection processing in Step S1 is processing of detecting a foreign substance such as a metal included in the inspection object 12. That is to say, the magnetic field generation unit 16 generates a magnetic field at the inspection frequency in the inspection region 14 and the magnetic field detection unit 18 detects the fluctuation of the magnetic field in the inspection region at the inspection frequency by causing the inspection object 12 to pass through the inspection region 14. Also, in the case in which the variation amount of the magnetic field exceeds a threshold value for each target foreign substance, NG is determined (foreign substance present), and the foreign substance is discharged from a conveyance line through a discharge function (not illustrated). Note that the threshold value for each target foreign substance is set in advance in accordance with the type (material) and size of the target foreign substance.

Figure 7:
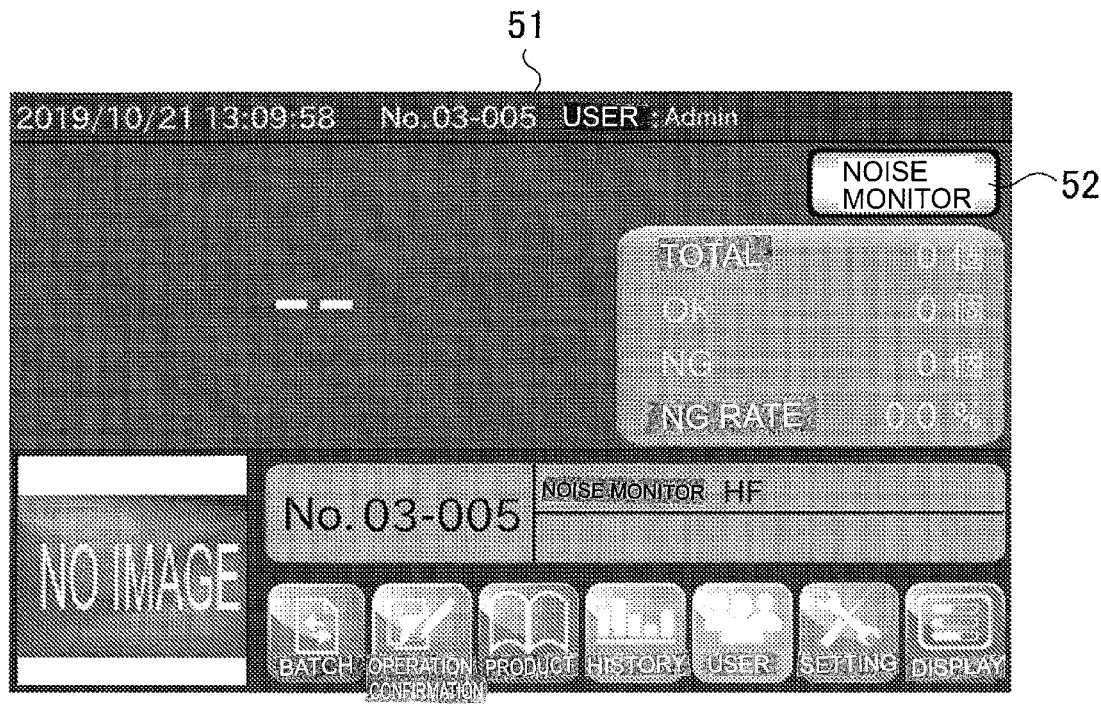
FIG. 7 is a diagram illustrating a display example of foreign substance detection processing.

In this foreign substance detection processing, the number of NG products may suddenly increase. In that case, since the influence of noise outside the device is suspected, noise diagnosis is started (Step S2). The diagnosis is started by pressing a noise diagnosis start button displayed on a screen of the display unit 50. FIG. 7 illustrates an example of a screen 51 during the foreign substance detection processing. The screen 51 illustrated in FIG. 7 is of a touch panel type and a display 52 of a "noise monitor" is illustrated as a noise diagnosis start button in the upper right of the screen. By pressing the display 52 of the "noise monitor," the noise diagnosis is started. Note that the noise diagnosis start button is not limited to the screen 51 and a mechanical button may be provided.

When the noise diagnosis is started, first, the foreign substance detection processing is temporarily stopped (Step S3). That is to say, the conveyance of the transfer target object 12 to the inspection region 14 is stopped and the generation of the magnetic field by the magnetic field generation unit 16 is stopped. Note that, although the generation of the magnetic field using the magnetic field generation unit 16 is stopped to improve the noise detection accuracy in the embodiment, the present invention is not limited thereto and the generation of the magnetic field and the foreign substance detection processing may be continued during the noise diagnosis.

After the foreign substance detection processing is temporarily stopped, the noise diagnosis processing is performed (Step S4). In the noise diagnosis processing, the data of the detection signal of the reception signal processing unit 24 is accumulated and subjected to frequency analysis while the inspection frequency on the detection side is changed in a predetermined range using the transmission signal setting unit 22. At that time, it is preferable to increase a speed of the diagnosis processing by performing a zoom FFT. The zoom FFT (also referred to as a "zoom band FFT/mixer method") is a signal processing method in which an analysis band is shifted to the vicinity of DC using a mixer for input data of a high sampling frequency, decimation processing is performed, and then FFT processing is performed to obtain high resolution, and is a signal processing method in which a small FFT of a short detection signal thinned out from an original detection signal is calculated to obtain a resolution that is the same as a resolution obtained from a full-size FFT of the original detection signal.

The range over which the inspection frequency is changed is a range centered around the inspection frequency (hereinafter referred to as a "set inspection frequency") being set in the foreign substance detection processing described above (Step S1). For example, in order to perform the inspection in the range of ±0.8 kHz in the case in which the set inspection frequency is 465 kHz, 465 kHz−0.8 kHz=464.2 kHz, that is a lower limit of the frequency range in which the noise diagnosis processing is performed, is set as the inspection frequency and the zoom FFT is performed while changing the inspection frequency to 465 kHz+0.8 kHz=465.8 kHz. In the case in which the frequency range in which the noise diagnosis processing is performed is wider than an analysis band of one zoom FFT, the inspection frequency is shifted by the analysis band of the zoom FFT and the next zoom FFT is performed. By repeatedly performing this up to the upper limit of the frequency range in which the noise diagnosis processing is performed, it is possible to obtain a frequency distribution diagram in a range centering on the set inspection frequency. Note that, although the zoom FFT is performed in the embodiment, the present invention is not limited thereto and the signal before the detection processing may be subjected to a normal FFT with a frame size suitable for the required frequency resolution. Here, if the zoom FFT is used, it is possible to save resources required for signal processing and to increase a speed of the signal processing.

Figure 4:
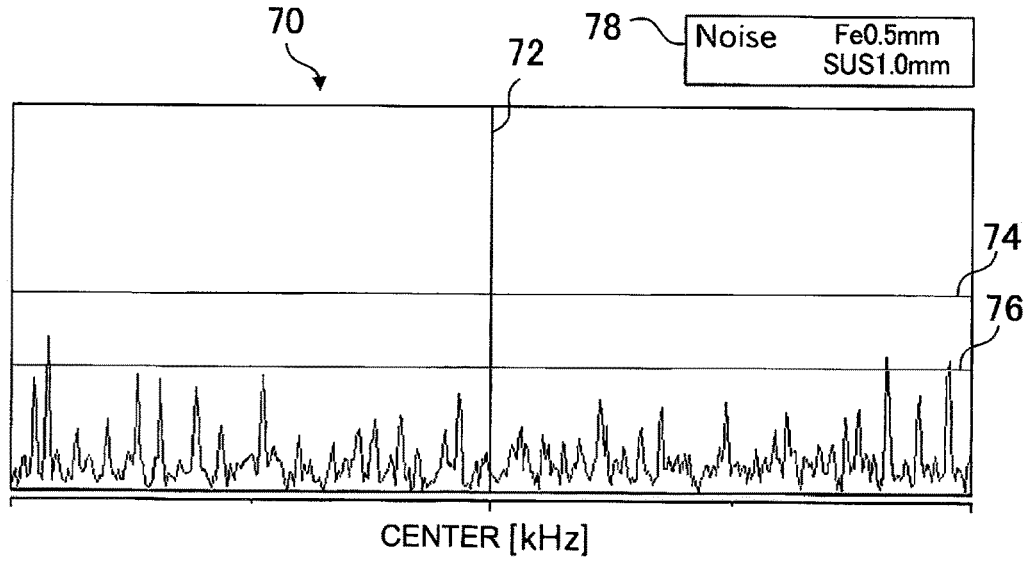
FIG. 4 is a diagram illustrating a display example of a noise diagnosis result.

Subsequently, a frequency distribution diagram is displayed on the display unit 50 as a noise diagnosis result (Step S5). FIG. 4 illustrates a display example of a noise diagnosis result. As illustrated in FIG. 4, a frequency distribution diagram 70 is displayed on the display unit (monitor) 50. In the frequency distribution diagram 70, a horizontal axis represents a frequency and a vertical axis represents a signal level (magnitude of noise). In addition, it is possible to ascertain the frequency in which there is noise at a glance.

In the frequency distribution diagram 70 illustrated in FIG. 4, a set frequency line 72 and reference lines 74 and 76 are displayed. The set frequency line 72 indicates the set inspection frequency during the foreign substance detection processing (Step S1) and is vertically illustrated in a center of the frequency distribution diagram 70. The reference lines 74 and 76 are lines serving as references for detection of the target foreign substance and are shown for each type and size of the target foreign substance. For example, the reference line 74 is displayed at a position of a signal level which appears as a variation (amplitude) of the detection signal in the case in which the target foreign substance is iron and has a diameter of 0.5 mm and when the foreign substance passes through the inspection region 14. On the other hand, the reference line 76 is displayed at a position of a signal level that appears as a variation of the detection signal in the case in which the target foreign substance is stainless steel and has a diameter of 1.0 mm and when the foreign substance passes through the inspection region 14. Therefore, in the case in which there is noise exceeding the reference lines 74 and 76, it is determined that there are foreign substances due to the noise. Note that reference numeral 78 in FIG. 4 is displayed to indicate the foreign substance with respect to the reference lines 74 and 76, and for example, the reference lines 74 and 76 and the description of the target foreign substance may be displayed in the same color.

In the display example of FIG. 4, it can be seen that many noises are generated in the entire frequency distribution diagram 70. It can be seen that a part of the noise exceeds the reference line 76, which is not suitable for detection of a foreign substance that is stainless steel of 1.0 mm.

As described above, according to the embodiment, since the frequency distribution diagram 70 is displayed on the display unit 50, the noise generation situation can be ascertained at a glance. Particularly, in the embodiment, since the change in the magnetic field is detected while changing the inspection frequency, noise having a frequency within the range can be detected at once and the noise generation situation can be quickly ascertained. In addition, according to the embodiment, since the noise diagnosis start button is displayed on the screen during the foreign substance detection processing, it is possible to quickly start noise diagnosis during the foreign substance detection processing and quickly obtain a noise diagnosis result.

Note that, after the noise diagnosis and display are finished, the processing may automatically return to the foreign substance detection processing. For example, after the noise diagnosis result is displayed for several seconds, the processing may automatically return to the foreign substance detection processing. Alternatively, in the case in which there is no noise exceeding the reference lines 74 and 76, the processing may automatically return to the foreign substance detection processing.

Figure 5:
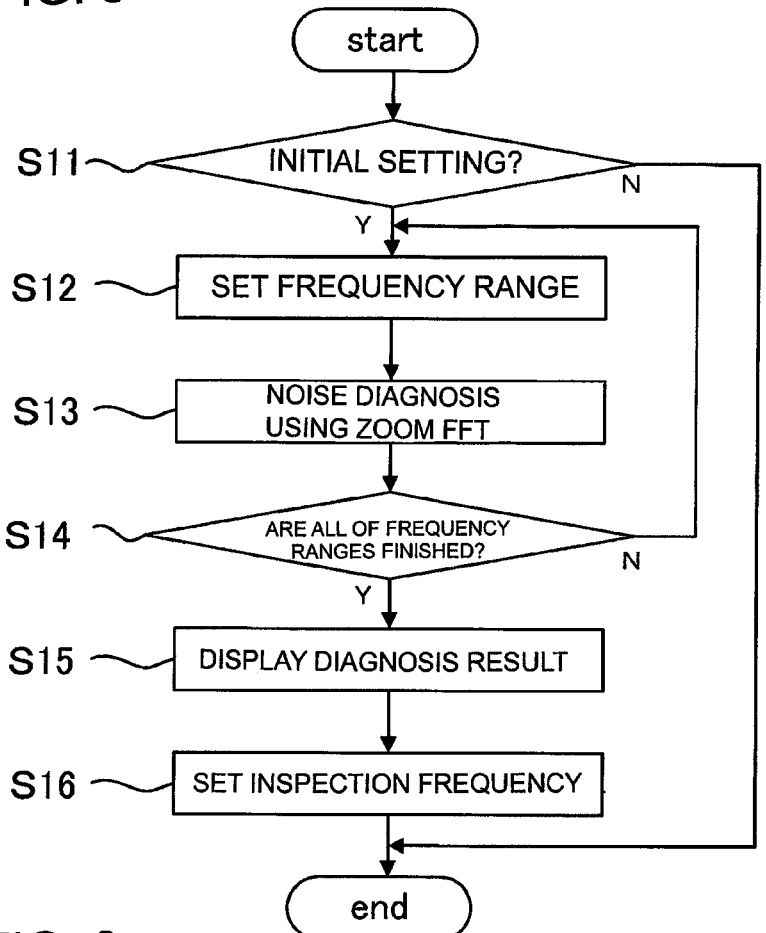
FIG. 5 is a flowchart for describing an example of processing of noise diagnosis.

FIG. 5 illustrates a flow of the noise diagnosis processing at the time of initial setting. In the initial setting, the inspection frequency is examined again and set to an appropriate inspection frequency. For example, setting values (hereinafter refer to as "negative, center, positive values") of three frequencies are prepared as the inspection frequency and the one with the least noise among them is set as the inspection frequency.

In the case in which the initial setting is performed (Step S11), first, a frequency range for diagnosing noise is set (Step S12). The range of frequencies to be diagnosed is prepared in correspondence with the three setting values (negative, center, positive values) of the inspection frequency and a predetermined range is diagnosed centering on the setting values. An order of the frequency ranges to be set is not particularly limited, but is automatically set, for example, in an order of the negative, center, and positive values.

Subsequently, the noise diagnosis processing in the set frequency range is performed (Step S13). The noise diagnosis processing is similar to that of Step S4 described above and the data of the detection signal of the reception signal processing unit 24 is accumulated and subjected to frequency analysis while the inspection frequency on the detection side is changed within a predetermined range using the transmission signal setting unit 22. At that time, it is preferable to perform a so-called zoom FFT which simultaneously performs a change in the inspection frequency and frequency analysis. The range in which the inspection frequency is changed is a range centering on the set value of the inspection frequency. Thus, a frequency distribution diagram in the range centering on the set value of the inspection frequency can be obtained.

When the noise diagnosis processing is finished, it is determined whether all of the frequency ranges are finished (Step S14), and if the noise diagnosis processing is not finished, the processing returns to that of step S12 to change to the next frequency range. Also, the noise diagnosis processing is performed again (Step S13).

Figure 6:
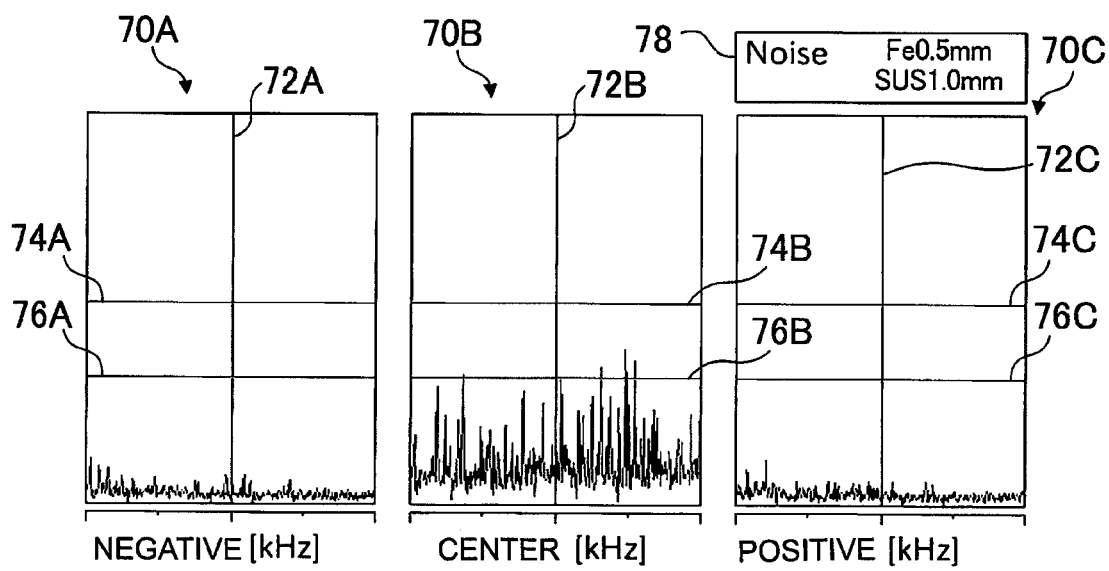
FIG. 6 is a diagram illustrating a display example of a noise diagnosis result.

On the other hand, in the case in which the noise diagnosis processing of all of the frequency ranges has been completed, the noise diagnosis result is displayed (Step S15). FIG. 6 illustrates a display example of the noise diagnosis result. In the example illustrated in FIG. 6, three frequency distribution diagrams 70A, 70B, and 70C are displayed for each frequency range. That is to say, a negative range frequency distribution diagram 70A, a center range frequency distribution diagram 70B, and a positive range frequency distribution diagram 70C are displayed. The frequency distribution diagrams 70A to 70C are displayed to be arranged side by side and the horizontal axis (signal level) indicates the same range.

In each of the frequency distribution diagrams 70A to 70C, the center vertical lines are set frequency lines 72A to 72C, and indicate the set values of the inspection frequencies in the respective ranges. In addition, reference lines 74A to 74C and reference lines 76A to 76C are displayed in the frequency distribution diagrams 70A to 70C, respectively. The reference lines 74A to 74C are the cases in which the material of the target foreign substance is iron and the size has a diameter of 0.5 mm and are displayed at the position of the signal level which appears as the fluctuation (amplitude) of the detection signal when the foreign substance passes through the inspection region 14. On the other hand, the reference lines 76A to 76C are the cases in which the material of the target foreign substance is stainless steel and the size has a diameter of 1.0 mm and are displayed at the position of the signal level which appears as the fluctuation of the detection signal when the foreign substance passes through the inspection region 14.

As can be seen from the noise diagnosis result of FIG. 6, a relatively large noise is generated in the center frequency distribution diagram 70B and a part of the noise exceeds the reference line 76B. For this reason, it can be seen that it is not suitable for inspection of foreign substances of stainless steel of 1.0 mm. In addition, in the negative frequency distribution diagram 70A and the positive frequency distribution diagram 70C, there are only small noise, which is significantly lower than the reference lines 74A and 74C and the reference lines 76A and 76C. Therefore, it can be seen that the negative range and the positive range are suitable for detection of both iron of 0.5 mm and stainless steel of 1.0 mm.

Figure 8:
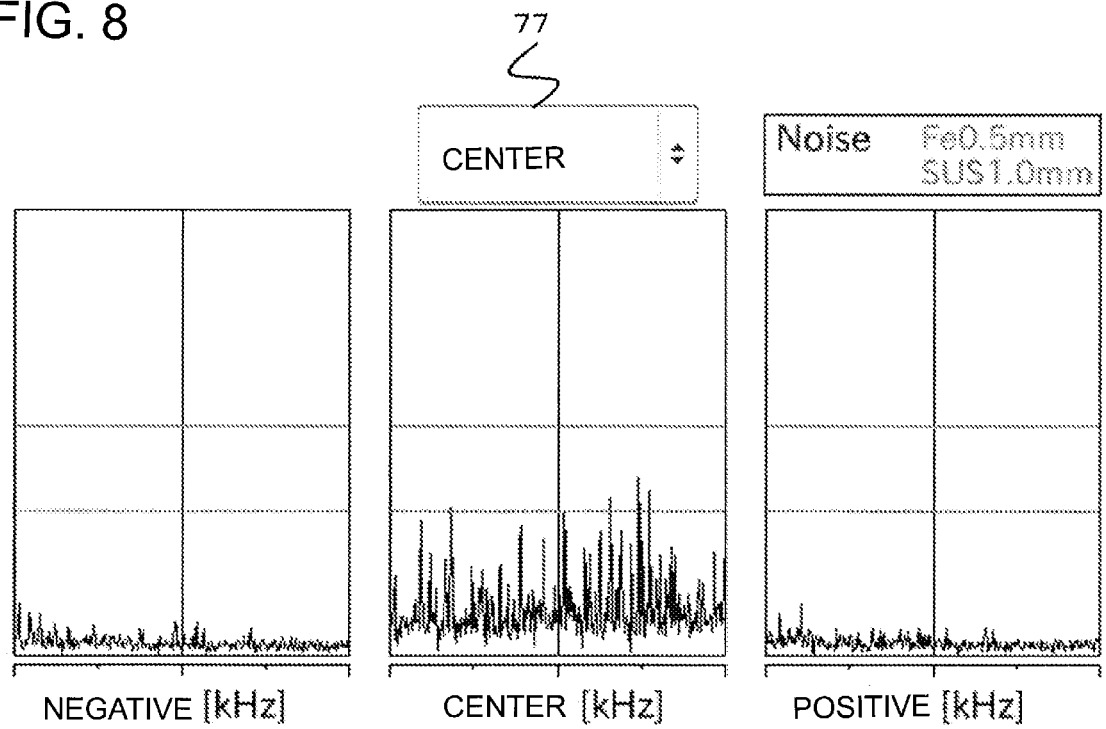
FIG. 8 is a diagram illustrating another display example of a noise diagnosis result.

An operator sets the inspection frequency to negative or positive while looking at the noise diagnosis result. As a result, the foreign substance detection processing can be performed under an environment with less influence of noise. Note that, the inspection frequency may be set by the operator or may be automatically set by specifying the inspection frequency which does not exceed the reference lines 74A to 74C or the reference lines 76A to 76C in the frequency distribution diagrams 70A to 70C. For example, as the noise diagnosis result illustrated in FIG. 8, in the case in which frequency selection button 77 in which one of the "negative," "center," and "positive" values is selectable is provided, the inspection frequency can be set by receiving the selection of one of the "negative," "center," and "positive" values in the frequency selection buttons.

As described above, according to the metal detector 10 of the embodiment, since the plurality of frequency distribution diagrams 70A to 70C is displayed, it is possible to ascertain the inspection frequency in which the noise is small by setting at a glance. In addition, since the reference lines 74A to 74C and the reference lines 76A to 76C of the target foreign substance are displayed in the respective frequency distribution diagrams 70A to 70C, it is possible to ascertain at a glance whether each type of the target foreign substance is suitable for detection.

Note that, although the reference lines 74A to 74C of iron of 0.5 mm and the reference lines 76A to 76C of stainless steel of 1.0 mm are displayed in the embodiment described above, the type and size of the target foreign substance are not limited thereto and can be set for various target foreign substances. In addition, the number of reference lines is not limited to two and may be one or three or more. Furthermore, it is preferable that the reference line of the frequency distribution diagram be also automatically changed when the target foreign substance in the foreign substance detection processing is changed.

DESCRIPTION OF NUMERICAL REFERENCE

10 Metal detector
12 Inspection object
14 Inspection region
16 Magnetic field generation unit
17 Transmission coil
18 Magnetic field detection unit
20 Control unit
22 Transmission signal setting unit
24 Reception signal processing unit
26 Noise diagnosis unit
28 Capacitor setting unit
32 D/A converter
34 Drive circuit
36 Transformer circuit
38 Capacitor adjustment unit
42 A/D converter
44 Amplifier circuit
46 Transformer circuit
50 Display unit
52 Display of noise diagnosis start button
62 Capacitor
64 Negative capacitor
65 Switch
66 Positive capacitor
67 Switch
70 (70A to 70C) Frequency distribution diagram
72 (72A to 72C) Set frequency line
74 (74A to 74C) Reference line
76 (76A to 76C) Reference line
78 Display of description of foreign substance

What is claimed is:
1. A device for detecting metal in an inspection region comprising
  a magnetic field generation unit,
  a magnetic field detection unit,
  a control unit, and
  a monitor,
wherein:
  the magnetic field generation unit generates a magnetic field in the inspection region;
  the magnetic field detection unit detects a magnetic field fluctuation in the inspection region;
  the control unit comprises a transmission signal setting unit, a reception signal processing unit, a noise diagnosis unit, and a capacitor setting unit;
and wherein:
  the control unit:
    measures a change in the magnetic field in the inspection region while changing a frequency in a frequency range including the inspection frequency without fixing the frequency at the inspection frequency, and
    displays a frequency distribution diagram obtained by performing frequency analysis of a measurement result on a monitor as a noise diagnosis result.
2. The device for detecting metal according to claim 1, wherein a reference line serving as a reference for inspection of the foreign substance is displayed in the frequency distribution diagram.

3. The device for detecting metal according to claim 2, wherein a plurality of the reference lines is displayed in accordance with a type and size of the foreign substance.

4. The device for detecting metal according to claim 1, wherein a set frequency line is displayed at a position corresponding to a set value of an inspection frequency for generating a magnetic field in the inspection region in the frequency distribution diagram.

5. The device for detecting metal according to claim 1, wherein a noise diagnosis button is displayed on the monitor during detection processing of the foreign substance and the noise diagnosis result is displayed by pressing the noise diagnosis button.

6. The device for detecting metal according to claim 1, wherein a plurality of the frequency distribution diagrams is acquired and displayed by changing the inspection frequency over a plurality of ranges.

7. The device for detecting metal according to claim 1, wherein the frequency analysis is performed using a zoom FFT.

8. The device for detecting metal according to claim 2, wherein a set frequency line is displayed at a position corresponding to a set value of an inspection frequency for generating a magnetic field in the inspection region in the frequency distribution diagram.

9. The device for detecting metal according to claim 2, wherein a noise diagnosis button is displayed on the monitor during detection processing of the foreign substance and the noise diagnosis result is displayed by pressing the noise diagnosis button.

10. The device for detecting metal according to claim 2, wherein a plurality of the frequency distribution diagrams is acquired and displayed by changing the inspection frequency over a plurality of ranges.

11. The device for detecting metal according to claim 2, wherein the frequency analysis is performed using a zoom FFT.

12. A device for detecting metal in an inspection region comprising
a magnetic field generation unit,
a magnetic field detection unit,
a control unit, and
a monitor,
wherein:
the magnetic field generation unit generates a magnetic field in the inspection region at a fixed inspection frequency;
the magnetic field detection unit detects a change in the magnetic field in the inspection region at the fixed inspection frequency to detect a metal in the inspection region; and
the control unit comprises a transmission signal setting unit, a reception signal processing unit, a noise diagnosis unit, and a capacitor setting unit,
and wherein:
the control unit:
is configured to be able to set a plurality of inspection frequencies;
sets a frequency range including the inspection frequency for each of the inspection frequencies;
measures the change in the magnetic field of the inspection region while changing the frequency in each of the set frequency range without fixing the frequency at the inspection frequency;
displays a plurality of frequency distribution diagrams obtained on the basis of a measurement result of the change in the magnetic field of the inspection region on a monitor as a noise diagnosis result; and
receives setting of the inspection frequency.

13. The device for detecting metal according to claim 12, wherein a set frequency line is displayed at a position corresponding to a set value of an inspection frequency for generating a magnetic field in the inspection region in the frequency distribution diagram.

14. The device for detecting metal according to claim 13, wherein a noise diagnosis button is displayed on the monitor during detection processing of the foreign substance and the noise diagnosis result is displayed by pressing the noise diagnosis button.

15. The device for detecting metal according to claim 14, wherein a plurality of the frequency distribution diagrams is acquired and displayed by changing the inspection frequency over a plurality of ranges.

16. The device for detecting metal according to claim 13, wherein a plurality of the frequency distribution diagrams is acquired and displayed by changing the inspection frequency over a plurality of ranges.

17. The device for detecting metal according to claim 13, wherein the frequency analysis is performed using a zoom FFT.

18. The device for detecting metal according to claim 12, wherein a noise diagnosis button is displayed on the monitor during detection processing of the foreign substance and the noise diagnosis result is displayed by pressing the noise diagnosis button.

19. The device for detecting metal according to claim 12, wherein a plurality of the frequency distribution diagrams is acquired and displayed by changing the inspection frequency over a plurality of ranges.

20. The device for detecting metal according to claim 12, wherein the frequency analysis is performed using a zoom FFT.

* * * * *